(12) United States Patent
Wakabayashi et al.

(10) Patent No.: US 7,981,829 B2
(45) Date of Patent: Jul. 19, 2011

(54) EXHAUST GAS PURIFYING CATALYST

(75) Inventors: Takashi Wakabayashi, Saitama (JP);
Yuunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 12/778,536

(22) Filed: May 12, 2010

(65) Prior Publication Data
US 2010/0311575 A1 Dec. 9, 2010

(30) Foreign Application Priority Data
Jun. 8, 2009 (JP) ................................ 2009-137670

(51) Int. Cl.
*B01J 21/06* (2006.01)
*B01J 21/12* (2006.01)
*B01J 23/10* (2006.01)
*B01J 23/38* (2006.01)
*B01J 23/54* (2006.01)
*B01J 23/63* (2006.01)

(52) U.S. Cl. ........ 502/240; 502/302; 502/303; 502/304; 502/325; 502/326; 502/327; 502/328; 502/330; 502/332; 502/340; 502/341; 502/344; 502/346

(58) Field of Classification Search .................. 502/240, 502/302–304, 325–328, 330, 332, 340, 341, 502/344, 346
See application file for complete search history.

(56) References Cited

FOREIGN PATENT DOCUMENTS

| JP | 06-055075 | | 3/1994 |
|---|---|---|---|
| JP | 11-197507 | | 7/1999 |
| JP | 2007-144412 | * | 6/2007 |
| JP | 2007-144412 | | 8/2007 |

OTHER PUBLICATIONS

Sumio Kato, Takuya Yoshizawa, Nobuhiro Kakuta, Shinya Akiyama, Masataka Obasawara, Takashi Wakabayashi, Yuunosuke Nakahara and Shinichi Nakata, "Preparation of apatite-type-silicate-supported precious metal catalysts for selective catalytic reduction of NOx" Res. Chem. Intermed. vol. 34, Nos. 8-9 (2008), pp. 703-708.*

Emma Kendrick, M. Saiful Islam, and Peter R. Slater, "Developing apatites for solid oxide fuel cells: insight into structural, transport and doping properties," Journal of Materials Chemistry, 17 (2007), pp. 3104-3111.*

(Continued)

*Primary Examiner* — Stanley Silverman
*Assistant Examiner* — Diana J Liao
(74) *Attorney, Agent, or Firm* — Young & Thompson

(57) ABSTRACT

An exhaust gas purifying catalyst includes: a composite oxide represented by: $(A_{a-w-x}M_wM'_x)(Si_{6-y}N_y)O_{27-z}$. A is a cation of at least one of La and Pr; M is a cation of at least one of Ba, Ca, and Sr; M' is a cation of at least one of Nd, Y, Al, Pr, Ce, Sr, Li, and Ca; N is a cation of at least one of Fe, Cu, and Al. The following are satisfied: $6 \leq a \leq 10$, $0 < w < 5$, $0 \leq x < 5$, $0 < w+x \leq 5$, $0 \leq y \leq 3$, $0 \leq z \leq 3$, $A \neq M'$, and $x \neq 0$ when A is a cation of La. A noble metal ingredient which forms a solid solution with the composite oxide or is supported on the composite oxide, and an exhaust gas purifying catalyst product formed of a carrier made of a ceramic or metallic material, and a layer of the exhaust gas purifying catalyst supported on the carrier.

6 Claims, 6 Drawing Sheets

OTHER PUBLICATIONS

Susumu Nakayama and Masatomi Sakamoto, "Electrical Properties of New Type High Oxide Ionic Conductor RE10Si6O27," Journal of the European Ceramic Society 18 (1998), p. 1413-1418.*

A.A. Yaremchenko, A.L. Shaula, V.V. Kharton, J.C. Waerenborgh, D.P. Rojas, M.V. Patrakeev, F.M.B. Marques, "Ionic and electronic conductivity of La9.83-xPrxSi4.5Fe1.5O26d apatites" Solid State Ionics 171 (2004), pp. 51-59.*

P.R. Slater, J.E.H. Sansom, J.R. Tolchard, "Development of Apatite-Type Oxide Ion Conductors," The Chemical Record, vol. 4 (2004), pp. 373-384.*

J. E. H. Sansom, E. Kendrick, J. R. Tolchard, M. S. Islam, P. R. Slater, "A comparison of the effect of rare earth vs Si site doping on the conductivities of apatite-type rare earth silicates," J Solid State Electrochem 10 (2006), pp. 562-568.*

* cited by examiner

EXHAUST GAS PURIFYING CATALYST

The entire disclosure of Japanese Patent Application Nos. 2009-137670 filed Jun. 8, 2009 and 2010-098268 filed Apr. 21, 2010 is expressly incorporated by reference herein.

TECHNICAL FIELD

The present invention relates to an exhaust gas purifying catalyst. More particularly, the present invention relates to a catalyst which exhibits high catalytic activity at low temperature (hereinafter referred to as "low-temperature activity") and excellent heat resistance, and which can attain consistent exhaust gas purification performance; for example, a catalyst which removes toxic components contained in exhaust gas discharged from an internal combustion engine of, for example, an automobile.

BACKGROUND ART

Exhaust gas discharged from an internal combustion engine of, for example, an automobile contains toxic components such as hydrocarbons (HC), carbon monoxide (CO), and nitrogen oxides ($NO_x$). Hitherto, ternary catalysts have been used for removing such toxic components for detoxifying the exhaust gas.

Some ternary catalysts are produced by applying, onto a honeycomb carrier made of, for example, a ceramic or metallic material, a certain combination of a noble metal (e.g., Pt, Pd, or Rh), and alumina, ceria, zirconia, or a composite oxide thereof. For example, there has been proposed an exhaust gas purifying catalyst containing a composite oxide having an apatite-type structure (see, for example, Patent Documents 1 and 2).

However, such a conventional ternary catalyst generally poses problems in that the catalyst does not initiate removal of toxic components contained in exhaust gas until a relatively high temperature, and thus the catalyst may fail to satisfactorily remove the toxic components at a low temperature. For example, such a conventional ternary may fail to satisfactorily remove toxic components contained in exhaust gas discharged from an engine of, for example, an automobile, since the catalyst is in a relatively low temperature state immediately after starting of the engine.

Also, such a conventional ternary catalyst generally poses problems in that the catalyst may exhibit lowered exhaust gas purification performance due to deterioration resulting from use in a relatively high temperature range, and the catalyst may fail to attain consistent exhaust gas purification performance over a low to high temperature range.

Therefore, demand has arisen for a ternary catalyst which attains exhaust gas purification effect in a relatively low temperature state, and which also attains gas purification performance in a high temperature range. The present inventors have previously proposed an exhaust gas purifying catalyst which contains a composite oxide represented by $(La_{a-x}M_x)(Si_{6-y}N_y)O_{27-z}$ and a noble metal component that forms a solid solution with the composite oxide or is supported on the composite oxide, which exhibits high low-temperature activity and excellent heat resistance, and which can attain consistent exhaust gas purification performance (see Patent Document 3).

PRIOR ART DOCUMENT

Patent Document

[Patent Document 1] Japanese Patent Document Laid-Open (kokai) No. H06-055075
[Patent Document 2] Japanese Patent Document Laid-Open (kokai) No. H11-197507
[Patent Document 3] Japanese Patent Document Laid-Open (kokai) No. 2007-144412

SUMMARY OF THE INVENTION

Problems to be Solved by the Invention

An object of the present invention is to provide an exhaust gas purifying catalyst which exhibits high low-temperature activity and excellent heat resistance, which can attain consistent exhaust gas purification performance, and which exhibits exhaust gas purification performance higher than that of the previously proposed catalyst formed of $(La_{a-x}M_x)(Si_{6-y}N_y)O_{27-z}$.

Means for Solving the Problems

The present inventors have conducted extensive studies for achieving the aforementioned object, and as a result have found that the object is attained by employing a noble metal component and a composite oxide represented by the following formula $(A_{a-w-x}M_wM'_x)(Si_{6-y}N_y)O_{27-z}$; i.e., a composite oxide in which A site is partially substituted by M and further by M' (i.e., a third component), or a composite oxide in which A site is not necessarily substituted by M' when A is Pr. The present invention has been accomplished on the basis of this finding.

Accordingly, the present invention provides an exhaust gas purifying catalyst characterized by comprising:

a composite oxide represented by the following formula:

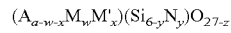

$$(A_{a-w-x}M_wM'_x)(Si_{6-y}N_y)O_{27-z}$$

wherein A is a cation of at least one element selected from the group consisting of La and Pr; M is a cation of at least one element selected from the group consisting of Ba, Ca, and Sr; M' is a cation of at least one element selected from the group consisting of Nd, Y, Al, Pr, Ce, Sr, Li, and Ca; N is a cation of at least one element selected from the group consisting of Fe, Cu, and Al; and the following relations are satisfied: $6 \leq a \leq 10$, $0 < w < 5$, $0 \leq x < 5$, $0 < w+x \leq 5$, $0 \leq y \leq 3$, $0 \leq z \leq 3$, $A \neq M'$, and $x \neq 0$ when A is a cation of La; and a noble metal ingredient which forms a solid solution with the composite oxide or is supported on the composite oxide.

The present invention also provides an exhaust gas purifying catalyst product characterized by comprising a carrier made of a ceramic or metallic material, and a layer of the aforementioned exhaust gas purifying catalyst supported on the carrier.

Effects of the Invention

The exhaust gas purifying catalyst of the present invention can exhibit consistent exhaust gas purification performance, since it exhibits high low-temperature activity and excellent heat resistance in a high temperature range.

MODES FOR CARRYING OUT THE INVENTION

Figure 1:
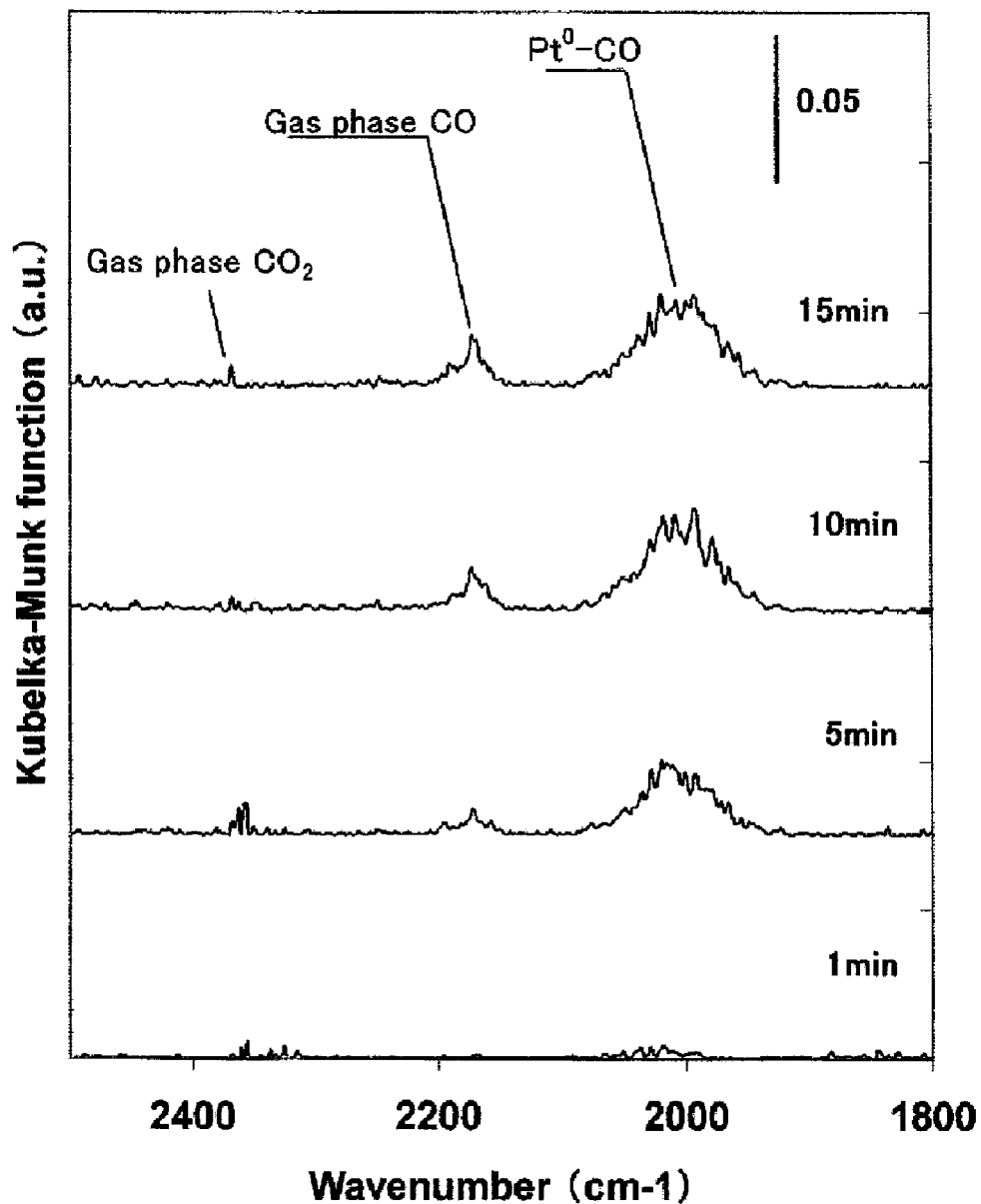
FIG. 1 shows the state of $C_3H_6$ adsorbed on the exhaust gas purifying catalyst of Example 1 in the case of heating to 300° C.

Embodiments of the present invention will next be described in detail.

The exhaust gas purifying catalyst of the present invention comprises:

a composite oxide having an apatite structure and represented by the following formula:

$$(A_{a-w-x}M_wM'_x)(Si_{6-y}N_y)O_{27-z}$$

wherein A is a cation of at least one element selected from the group consisting of La and Pr; M is a cation of at least one element selected from the group consisting of Ba, Ca, and Sr; M' is a cation of at least one element selected from the group consisting of Nd, Y, Al, Pr, Ce, Sr, Li, and Ca; N is a cation of at least one element selected from the group consisting of Fe, Cu, and Al; and the following relations are satisfied: $6 \leq a \leq 10$, $0 < w < 5$, $0 \leq x < 5$, $0 < w+x \leq 5$, $0 \leq y \leq 3$, $0 \leq z \leq 3$, $A \neq M'$, and $x \neq 0$ when A is a cation of La; and a noble metal ingredient which forms a solid solution with the composite oxide or is supported on the composite oxide.

When A is a cation of La, the composite oxide forming the exhaust gas purifying catalyst of the present invention is represented by the following formula:

$$(La_{a-w-x}M_wM'_x)(Si_{6-y}N_y)O_{27-z}$$

wherein M is a cation of at least one element selected from the group consisting of Ba, Ca, and Sr; M' is a cation of at least one element selected from the group consisting of Nd, Y, Al, Pr, Ce, Sr, Li, and Ca; N is a cation of at least one element selected from the group consisting of Fe, Cu, and Al; and the following relations are satisfied: $6 \leq a \leq 10$, $0 < w < 5$, $0 < x < 5$, $0 < w+x \leq 5$, $0 \leq y \leq 3$, and $0 \leq z \leq 3$.

When A is a cation of Pr, the composite oxide forming the exhaust gas purifying catalyst of the present invention is represented by the following formula:

$$(Pr_{a-w-x}M_wM'_x)(Si_{6-y}N_y)O_{27-z}$$

wherein M is a cation of at least one element selected from the group consisting of Ba, Ca, and Sr; M' is a cation of at least one element selected from the group consisting of Nd, Y, Al, Ce, Sr, Li, and Ca; N is a cation of at least one element selected from the group consisting of Fe, Cu, and Al; and the following relations are satisfied: $6 \leq a \leq 10$, $0 < w < 5$, $0 \leq x < 5$, $0 < w+x \leq 5$, $0 \leq y \leq 3$, and $0 \leq z \leq 3$.

When the composite oxide represented by the aforementioned formula $(A_{a-w-x}M_wM'_x)(Si_{6-y}N_y)O_{27-z}$ and having an apatite structure has a stoichiometric composition, a is 10, whereas when the composite oxide has a non-stoichiometric composition, a is smaller than 10. In a practically and readily available composite oxide represented by the aforementioned formula and having a non-stoichiometric composition, a satisfies the following relation: $6 \leq a < 10$. Therefore, the exhaust gas purifying catalyst of the present invention employs a composite oxide wherein $6 \leq a \leq 10$, preferably $7 \leq a < 10$.

The exhaust gas purifying catalyst of the present invention employs a composite oxide in which, the following relations are satisfied: preferably $0.1 \leq w \leq 4$, more preferably $0.5 \leq w \leq 3.5$; preferably $0.1 \leq x \leq 4$, more preferably $0.5 \leq x \leq 3.5$ when A is La; preferably $0 \leq x \leq 4$, more preferably $0 \leq x \leq 3.5$ when A is Pr; preferably $0.1 \leq w+x \leq 4$, more preferably $0.5 \leq w+x \leq 3.5$; and (or) preferably $0 \leq y \leq 2.5$, more preferably $0 \leq y \leq 2$; and preferably $0 \leq z \leq 2.5$.

The exhaust gas purifying catalyst of the present invention exhibits sufficiently high catalytic activity even at a relatively low temperature immediately after starting of an engine of, for example, an automobile, attains excellent exhaust gas purification performance in a low temperature range, and exhibits excellent heat resistance in a high temperature range. Thus, the exhaust gas purifying catalyst attains consistent exhaust gas purification performance over a low to high temperature range. Therefore, the exhaust gas purifying catalyst is suitably employed for purification of exhaust gas discharged from an internal combustion engine of, for example, an automobile.

The noble metal component of the exhaust gas purifying catalyst of the present invention is preferably, for example, rhodium, palladium, or platinum, more preferably platinum or palladium.

The noble metal component of the exhaust gas purifying catalyst of the present invention may form a solid solution with the composite oxide forming the catalyst, or may be supported on the composite oxide. Incorporation of the noble metal component into the composite oxide may be carried out through, for example, a process wherein the composite oxide in the form of powder or slurry is immersed in or mixed with a solution containing the noble metal (basic or acidic noble metal salt solution) to thereby adsorb the noble metal component onto the composite oxide, and the resultant product is fired; a process wherein the noble metal component is mixed with a slurry of the composite oxide during production of the composite oxide, and the resultant mixture is fired; or a process wherein a carrier (e.g., an oxide) on which the noble metal component has been supported is mixed with the composite oxide, and the resultant mixture is subjected to firing or a similar treatment.

The exhaust gas purifying catalyst product of the present invention may be in the form of an exhaust gas purifying catalyst containing the aforementioned composite oxide and noble metal component. However, generally, the exhaust gas purifying catalyst product is formed of a carrier made of a ceramic or metallic material, and a layer of the exhaust gas purifying catalyst supported on the carrier.

In the aforementioned exhaust gas purifying catalyst product, no particular limitation is imposed on the form of the carrier made of a ceramic or metallic material. However, the carrier is generally in the form of, for example, honeycomb, plate, or pellet, and is preferably in a honeycomb form. Examples of the material of the carrier include ceramic materials such as alumina ($Al_2O_3$), mullite ($3Al_2O_3 \cdot 2SiO_2$), and cordierite ($2MgO \cdot 2Al_2O_3 \cdot 5SiO_2$); and metallic materials such as stainless steel.

The exhaust gas purifying catalyst product including such a carrier and a layer of the exhaust gas purifying catalyst supported thereon may be produced through, for example, a process wherein a slurry of the composite oxide with which the noble metal component forms a solid solution or on which the noble metal component is supported is applied to a carrier to thereby form a precursor layer of the exhaust gas purifying catalyst, and the precursor layer is fired; a process wherein a slurry of the composite oxide is applied to a carrier to thereby form a layer of the composite oxide, and the carrier having the composite oxide layer is immersed in a solution containing the noble metal component to thereby adsorb the noble metal component onto the composite oxide layer, followed by firing of the resultant product; or a process wherein an oxide on which the noble metal component has been supported is mixed with the aforementioned composite oxide to thereby prepare a slurry, and the slurry is applied to a carrier to thereby form a precursor layer of the exhaust gas purifying catalyst, followed by firing of the precursor layer.

EXAMPLES

The present invention will next be described with reference to Examples and Comparative Examples.

Example 1

Firstly, lanthanum nitrate, barium nitrate, neodymium nitrate, and colloidal silica were weighed so as to attain a composition of $La_{7.33}BaNdSi_6O_{25.50}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $La_{7.33}BaNdSi_6O_{25.50}$ of interest. Subsequently, the thus-produced $La_{7.33}BaNdSi_6O_{25.50}$ was impregnated with dinitrodiammine platinum so that the amount of Pt was 1 mass % with respect to the $La_{7.33}BaNdSi_6O_{25.50}$, followed by evaporation to dryness. The resultant product was fired at 600° C. for three hours, to thereby produce an exhaust gas purifying catalyst formed of Pt (1 mass %)/$La_{7.33}BaNdSi_6O_{25.50}$.

Example 2

Firstly, lanthanum nitrate, barium nitrate, neodymium nitrate, iron nitrate, and colloidal silica were weighed so as to attain a composition of $La_{7.33}BaNdSi_{4.5}Fe_{1.5}O_{24.75}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $La_{7.33}BaNdSi_{4.5}Fe_{1.5}O_{24.75}$ of interest. Subsequently, the thus-produced $La_{7.33}BaNdSi_{4.5}Fe_{1.5}O_{24.75}$ was impregnated with dinitrodiammine platinum so that the amount of Pt was 1 mass % with respect to the $La_{7.33}BaNdSi_{4.5}Fe_{1.5}O_{24.75}$, followed by evaporation to dryness. The resultant product was fired at 600° C. for three hours, to thereby produce an exhaust gas purifying catalyst formed of Pt (1 mass %)/$La_{7.33}BaNdSi_{4.5}Fe_{1.5}O_{24.75}$.

Example 3

The procedure of Example 1 was repeated, except that neodymium nitrate was replaced with yttrium nitrate, to thereby produce an exhaust gas purifying catalyst formed of Pt (1 mass %)/$La_{7.33}BaYSi_6O_{25.50}$.

Example 4

The procedure of Example 1 was repeated, except that neodymium nitrate was replaced with praseodymium nitrate, to thereby produce an exhaust gas purifying catalyst formed of Pt (1 mass %)/$La_{7.33}BaPrSi_6O_{25.83}$.

Example 5

The procedure of Example 2 was repeated, except that neodymium nitrate was replaced with yttrium nitrate, to thereby produce an exhaust gas purifying catalyst formed of Pt (1 mass %)/$La_{7.33}BaYSi_{4.5}Fe_{1.5}O_{24.75}$.

Example 6

The procedure of Example 2 was repeated, except that neodymium nitrate was replaced with praseodymium nitrate, to thereby produce an exhaust gas purifying catalyst formed of Pt (1 mass %)/$La_{7.33}BaPrSi_{4.5}Fe_{1.5}O_{25.08}$.

Comparative Example 1

Activated alumina was impregnated with dinitrodiammine platinum so that the amount of Pt was 1 mass % with respect to the activated alumina, followed by evaporation to dryness. The resultant product was fired at 600° C. for three hours, to thereby produce a comparative exhaust gas purifying catalyst formed of Pt (1 mass %)/$Al_2O_3$.

Comparative Example 2

Firstly, lanthanum nitrate, barium nitrate, iron nitrate, and colloidal silica were weighed so as to attain a composition of $La_{8.33}BaSi_{4.5}Fe_{1.5}O_{24.75}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $La_{8.33}BaSi_{4.5}Fe_{1.5}O_{24.75}$ of interest. Subsequently, the thus-produced $La_{8.33}BaSi_{4.5}Fe_{1.5}O_{24.75}$ was impregnated with dinitrodiammine platinum so that the amount of Pt was 1 mass % with respect to the $La_{8.33}BaSi_{4.5}Fe_{1.5}O_{24.75}$, followed by evaporation to dryness. The resultant product was fired at 600° C. for three hours, to thereby produce a comparative exhaust gas purifying catalyst formed of Pt (1 mass %)/$La_{8.33}BaSi_{4.5}Fe_{1.5}O_{24.75}$.

<Exhaust Gas Purification Performance Test>

Each of the exhaust gas purifying catalysts of Examples 1 and 2 wherein the noble metal is Pt and A is La and Comparative Examples 1 and 2 was sieved to a portion (20 to 60 mesh), and the catalyst (0.1 g) was charged into a reactor of a fixed-bed flow reaction apparatus. A model gas having a composition shown in Table 1 was caused to flow through the reactor at a rate of 0.5 L/min, and the exhaust gas purification performance of the catalyst was evaluated at a temperature of 200 to 600° C. The results are shown in Tables 2 and 3.

TABLE 1

Composition of model gas

| $C_3H_6$ | NO | $O_2$ | He |
|---|---|---|---|
| 1500 ppm | 1000 ppm | 9000 ppm | Balance |

TABLE 2

Percent removal of $C_3H_6$ (%)

| Measurement temperature | Example 1 | Example 2 | Comparative Example 1 | Comparative Example 2 |
|---|---|---|---|---|
| 200° C. | 0.5 | 0.0 | 0.0 | 0.0 |
| 300° C. | 92.5 | 86.2 | 1.1 | 95.1 |
| 350° C. | 99.0 | 97.5 | 8.3 | 99.0 |
| 400° C. | 99.8 | 99.6 | 89.8 | 99.5 |
| 450° C. | 100.0 | 99.9 | 99.4 | 99.8 |
| 500° C. | 100.0 | 100.0 | 100.0 | 99.9 |
| 550° C. | 100.0 | 100.0 | 100.0 | 100.0 |
| 600° C. | 100.0 | 100.0 | 100.0 | 100.0 |

TABLE 3

Percent removal of $NO_x$ (%)

| Measurement temperature | Example 1 | Example 2 | Comparative Example 1 | Comparative Example 2 |
|---|---|---|---|---|
| 200° C. | 0.0 | 0.0 | 0.0 | 0.0 |
| 300° C. | 56.0 | 54.7 | 2.4 | 53.0 |
| 350° C. | 45.7 | 44.5 | 14.3 | 38.7 |
| 400° C. | 38.9 | 36.8 | 28.9 | 30.6 |
| 450° C. | 31.9 | 31.2 | 20.1 | 23.4 |
| 500° C. | 26.6 | 28.3 | 17.0 | 19.2 |
| 550° C. | 22.4 | 19.7 | 15.7 | 19.1 |
| 600° C. | 21.1 | 19.4 | 15.2 | 19.1 |

As is clear from data shown in Tables 2 and 3, the exhaust gas purifying catalysts of Examples 1 and 2 (i.e., the catalysts of the present invention) exhibit excellent $C_3H_6$ and $NO_x$ removal performance at a temperature of about 300° C. or lower, and also exhibit consistent $C_3H_6$ and $NO_x$ removal performance in a high temperature range, as compared with the exhaust gas purifying catalyst of Comparative Example 1. The exhaust gas purifying catalysts of Examples 1 and 2 (i.e., the catalysts of the present invention) exhibit $C_3H_6$ removal performance almost comparable to that of the exhaust gas purifying catalyst of Comparative Example 2, but exhibit high $NO_x$ removal performance in a high temperature range exceeding 350° C., as compared with the catalyst of Comparative Example 2.

Example 7

Firstly, praseodymium nitrate, calcium nitrate, and colloidal silica were weighed so as to attain a composition of $Pr_{7.33}Ca_2Si_6O_{25.00}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $Pr_{7.33}Ca_2Si_6O_{25.00}$ of interest. Subsequently, the thus-produced $Pr_{7.33}Ca_2Si_6O_{25.00}$ was impregnated with dinitrodiammine platinum so that the amount of Pt was 1 mass % with respect to the $Pr_{7.33}Ca_2Si_6O_{25.00}$, followed by evaporation to dryness. The resultant product was fired at 600° C. for three hours, to thereby produce an exhaust gas purifying catalyst formed of Pt (1 mass %)/$Pr_{7.33}Ca_2Si_6O_{25.00}$.

Example 8

The procedure of Example 7 was repeated, except that calcium nitrate was replaced with strontium nitrate, to thereby produce an exhaust gas purifying catalyst formed of Pt (1 mass %)/$Pr_{7.33}Sr_2Si_6O_{25.00}$.

Example 9

The procedure of Example 7 was repeated, except that calcium nitrate was replaced with barium nitrate, to thereby produce an exhaust gas purifying catalyst formed of Pt (1 mass %)/$Pr_{7.33}Ba_2Si_6O_{25.00}$.

Example 10

Firstly, praseodymium nitrate, barium nitrate, neodymium nitrate, and colloidal silica were weighed so as to attain a composition of $Pr_{6.33}Ba_2NdSi_6O_{25.00}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $Pr_{6.33}Ba_2NdSi_6O_{25.00}$ of interest. Subsequently, the thus-produced $Pr_{6.33}Ba_2NdSi_6O_{25.00}$ was impregnated with dinitrodiammine platinum so that the amount of Pt was 1 mass % with respect to the $Pr_{6.33}Ba_2NdSi_6O_{25.00}$, followed by evaporation to dryness. The resultant product was fired at 600° C. for three hours, to thereby produce an exhaust gas purifying catalyst formed of Pt (1 mass %)/$Pr_{6.33}Ba_2NdSi_6O_{25.00}$.

Example 11

The procedure of Example 10 was repeated, except that neodymium nitrate was replaced with yttrium nitrate, to thereby produce an exhaust gas purifying catalyst formed of Pt (1 mass %)/$Pr_{6.33}Ba_2YSi_6O_{25.00}$.

<Exhaust Gas Purification Performance Test>

Each of the exhaust gas purifying catalysts of Examples 7 to 11 wherein the noble metal is Pt and A is Pr was sieved to a portion (20 to 60 mesh), and the catalyst (0.1 g) was charged into a reactor of a fixed-bed flow reaction apparatus. The model gas having a composition shown in said Table 1 was caused to flow through the reactor at a rate of 0.5 L/min, and the exhaust gas purification performance of the catalyst was evaluated at a temperature of 200 to 600° C. The results are shown in Tables 4 and 5.

TABLE 4

Percent removal of $C_3H_6$ (%)

| Measurement temperature | Example 7 | Example 8 | Example 9 | Example 10 | Example 11 |
|---|---|---|---|---|---|
| 200° C. | 0.0 | 0.0 | 0.0 | 0.0 | 0.0 |
| 300° C. | 7.2 | 80.0 | 97.8 | 97.6 | 98.0 |
| 350° C. | 88.6 | 99.8 | 100.0 | 100.0 | 100.0 |

TABLE 4-continued

Percent removal of $C_3H_6$ (%)

| Measurement temperature | Example 7 | Example 8 | Example 9 | Example 10 | Example 11 |
|---|---|---|---|---|---|
| 400° C. | 99.8 | 100.0 | 100.0 | 100.0 | 100.0 |
| 450° C. | 100.0 | 100.0 | 100.0 | 100.0 | 100.0 |
| 500° C. | 100.0 | 100.0 | 100.0 | 100.0 | 100.0 |
| 550° C. | 100.0 | 100.0 | 100.0 | 100.0 | 100.0 |
| 600° C. | 100.0 | 100.0 | 100.0 | 100.0 | 100.0 |

TABLE 5

Percent removal of $NO_x$ (%)

| Measurement temperature | Example 7 | Example 8 | Example 9 | Example 10 | Example 11 |
|---|---|---|---|---|---|
| 200° C. | 0.0 | 0.0 | 0.0 | 0.0 | 0.0 |
| 300° C. | 1.3 | 50.0 | 55.4 | 55.1 | 56.1 |
| 350° C. | 21.6 | 42.0 | 35.8 | 36.4 | 40.8 |
| 400° C. | 35.5 | 31.2 | 22.2 | 30.7 | 32.5 |
| 450° C. | 28.6 | 21.8 | 18.9 | 27.5 | 26.1 |
| 500° C. | 22.5 | 22.4 | 20.0 | 23.6 | 23.6 |
| 550° C. | 28.6 | 28.4 | 22.5 | 28.3 | 29.4 |
| 600° C. | 32.1 | 28.6 | 23.0 | 29.5 | 30.0 |

As is clear from data shown in Tables 4 and 5, the exhaust gas purifying catalysts of Examples 7 to 11 (i.e., the catalysts of the present invention) exhibit excellent $C_3H_6$ and $NO_x$ removal performance at a temperature of about 350° C. or lower, and also exhibit consistent $C_3H_6$ and $NO_x$ removal performance in a high temperature range, as compared with the exhaust gas purifying catalyst of Comparative Example 1. The exhaust gas purifying catalysts of Examples 8 to 11 (i.e., the catalysts of the present invention) exhibit $C_3H_6$ removal performance almost comparable to that of the exhaust gas purifying catalyst of Comparative Example 2, but exhibit high $NO_x$ removal performance in a high temperature range exceeding 350° C., as compared with the catalyst of Comparative Example 2.

Example 12

The procedure of Example 1 was repeated, except that the $La_{7.33}BaNdSi_6O_{25.50}$ was impregnated with palladium nitrate so that the amount of Pd was 1 mass % with respect to the $La_{7.33}BaNdSi_6O_{25.50}$, to thereby produce an exhaust gas purifying catalyst formed of Pd (1 mass %)/$La_{7.33}BaNdSi_6O_{25.50}$.

Example 13

The procedure of Example 1 was repeated, except that neodymium nitrate was replaced with yttrium nitrate and the $La_{7.33}BaYSi_6O_{25.50}$ was impregnated with palladium nitrate so that the amount of Pd was 1 mass % with respect to the $La_{7.33}BaNdSi_6O_{25.50}$, to thereby produce an exhaust gas purifying catalyst formed of Pd (1 mass %)/$La_{7.33}BaYSi_6O_{25.50}$.

Example 14

The procedure of Example 7 was repeated, except that calcium nitrate was replaced with barium nitrate and the $Pr_{7.33}Ba_2Si_6O_{25.50}$ was impregnated with palladium nitrate so that the amount of Pd was 1 mass % with respect to the $Pr_{7.33}Ba_2Si_6O_{25.50}$, to thereby produce an exhaust gas purifying catalyst formed of Pd (1 mass %)/$Pr_{7.33}Ba_2Si_6O_{25.50}$.

Comparative Example 3

The procedure of Comparative Example 1 was repeated, except that dinitrodiammine platinum was replaced with palladium nitrate, to thereby produce an exhaust gas purifying catalyst formed of Pd (1 mass %)/$Al_2O_3$.

Comparative Example 4

Firstly, lanthanum nitrate and colloidal silica were weighed so as to attain a composition of $La_{9.33}Si_6O_{26.00}$ and added to pure water, and the resultant mixture was stirred, to thereby prepare a transparent solution. The transparent solution was added dropwise to a solution mixture of aqueous ammonia and ammonium carbonate, to thereby produce a precipitate. The precipitate was aged at 40° C. for 24 hours and then washed with water, followed by filtration, and drying at 100° C., to thereby produce a precursor. The precursor was fired at 900° C. for six hours, to thereby produce $La_{9.33}Si_6O_{26.00}$ of interest. Subsequently, the thus-produced $La_{9.33}Si_6O_{26.00}$ was impregnated with palladium nitrate so that the amount of Pt was 1 mass % with respect to the $La_{9.33}Si_6O_{26.00}$, followed by evaporation to dryness. The resultant product was fired at 600° C. for three hours, to thereby produce a comparative exhaust gas purifying catalyst formed of Pd (1 mass %)/$La_{9.33}Si_6O_{26.00}$.

<Exhaust Gas Purification Performance Test>

Each of the exhaust gas purifying catalysts of Examples 12 to 14 wherein the noble metal is Pd and Comparative Examples 3 and 4 was sieved to a portion (20 to 60 mesh), and the catalyst (0.1 g) was charged into a reactor of a fixed-bed flow reaction apparatus. The model gas having a composition shown in said Table 1 was caused to flow through the reactor at a rate of 0.5 L/min, and the exhaust gas purification performance of the catalyst was evaluated at a temperature of 200 to 600° C. The results are shown in Table 6.

TABLE 6

Percent removal of $NO_x$ (%)

| Measurement temperature | Example 12 | Example 13 | Example 14 | Comparative Example 3 | Comparative Example 4 |
|---|---|---|---|---|---|
| 200° C. | 3.5 | 5.2 | 0.5 | 2.9 | 0.1 |
| 300° C. | 37.4 | 39.1 | 38.9 | 28.1 | 36.0 |
| 350° C. | 25.6 | 27.2 | 25.0 | 22.9 | 24.8 |
| 400° C. | 13.8 | 14.9 | 9.8 | 15.4 | 10.9 |
| 450° C. | 7.7 | 9.8 | 4.8 | 11.1 | 3.4 |
| 500° C. | 2.9 | 3.0 | 4.0 | 0.0 | 0.7 |
| 550° C. | 1.2 | 3.2 | 2.6 | 0.0 | 0.3 |
| 600° C. | 0.2 | 0.8 | 1.2 | 4.7 | 0.3 |

As is clear from data shown in Table 6, the exhaust gas purifying catalysts of Examples 12 to 14 (i.e., the catalysts of the present invention) exhibit excellent $NO_x$ removal performance at a temperature of about 350° C. or lower as compared with the exhaust gas purifying catalyst of Comparative Examples 3 and 4.

Production of Exhaust Gas Purifying Catalyst Supported on Carrier

Example 15

$La_{7.33}BaNdSi_6O_{25.50}$ produced in a manner similar to that described in Example 1 (45 parts by mass, hereinafter "parts by mass" will be referred to simply as "parts"), $CeZrO_2$ (45 parts), alumina sol (10 parts), and water (130 parts) were mixed by means of a ball mill, to thereby prepare slurry A. Separately, activated alumina (30 parts), $CeZrO_2$ (60 parts), alumina sol (10 parts), and water (150 parts) were mixed by means of a ball mill, to thereby prepare slurry B.

A cordierite honeycomb base structure was immersed in slurry A and taken out therefrom, and then excess slurry was removed from the base structure through blowing. Subsequently, the resultant honeycomb base structure was dried at 90° C. for 10 minutes and fired at 600° C. for three hours, to thereby form a coating layer. The amount of the coating layer was found to be 100 g on the basis of 1 L of the honeycomb base structure. The resultant honeycomb base structure having the coating layer was immersed in a certain concentration of aqueous dinitrodiammine Pt solution and taken out therefrom, and then excess droplets were removed from the base structure through blowing. Thereafter, the honeycomb base structure was dried at 90° C. for 10 minutes and fired at 600° C. for three hours, to thereby support Pt on the coating layer so that the amount of Pt was 0.60 g on the basis of 100 g of the coating layer (corresponding to 1 L of the honeycomb base structure). Thus, a first noble-metal-supported layer was formed.

Subsequently, the honeycomb base structure on which the first noble-metal-supported layer had been formed was immersed in slurry B and taken out therefrom, and then excess slurry was removed from the base structure through blowing. Thereafter, the resultant honeycomb base structure was dried at 90° C. for 10 minutes and fired at 600° C. for three hours, to thereby form a coating layer. The amount of the coating layer was found to be 100 g on the basis of 1 L of the honeycomb base structure. The resultant honeycomb base structure was immersed in a certain concentration of aqueous rhodium nitrate solution and taken out therefrom, and then excess droplets were removed from the base structure through blowing. Thereafter, the honeycomb base structure was dried at 90° C. for 10 minutes and fired at 600° C. for three hours, to thereby support Rh on the coating layer so that the amount of Rh was 0.20 g on the basis of 100 g of the coating layer (corresponding to 1 L of the honeycomb base structure). Thus, a second noble-metal-supported layer was formed, to thereby produce an exhaust gas purifying catalyst product of the present invention including an exhaust gas purifying catalyst layer supported on a carrier.

Example 16

The procedure of Example 15 was repeated, except that $La_{7.33}BaNdSi_6O_{25.50}$ was replaced with $La_{7.33}BaYSi_6O_{25.50}$ produced in a manner similar to that described in Example 3, to thereby produce an exhaust gas purifying catalyst product of the present invention including an exhaust gas purifying catalyst layer supported on a carrier.

Example 17

The procedure of Example 15 was repeated, except that $La_{7.33}BaNdSi_6O_{25.50}$ was replaced with $La_{7.33}BaPrSi_6O_{25.83}$ produced in a manner similar to that described in Example 4, to thereby produce an exhaust gas purifying catalyst product of the present invention including an exhaust gas purifying catalyst layer supported on a carrier.

Example 18

The procedure of Example 15 was repeated, except that $La_{7.33}BaNdSi_6O_{25.50}$ was replaced with $La_{7.33}BaNdSi_{4.5}Fe_{1.5}O_{24.75}$ produced in a manner similar to that described in Example 2, to thereby produce an exhaust gas purifying catalyst product of the present invention including an exhaust gas purifying catalyst layer supported on a carrier.

Example 19

The procedure of Example 15 was repeated, except that $La_{7.33}BaNdSi_6O_{25.50}$ was replaced with $La_{7.33}BaYSi_{4.5}Fe_{1.5}O_{24.75}$ produced in a manner similar to that described in Example 5, to thereby produce an exhaust gas purifying catalyst product of the present invention including an exhaust gas purifying catalyst layer supported on a carrier.

Example 20

The procedure of Example 15 was repeated, except that $La_{7.33}BaNdSi_6O_{25.50}$ was replaced with $La_{7.33}BaPrSi_{4.5}Fe_{1.5}O_{25.08}$ produced in a manner similar to that described in Example 6, to thereby produce an exhaust gas purifying catalyst product of the present invention including an exhaust gas purifying catalyst layer supported on a carrier.

Example 21

The procedure of Example 15 was repeated, except that $La_{7.33}BaNdSi_6O_{25.50}$ was replaced with $Pr_{7.33}Ca_2Si_6O_{25.00}$ produced in a manner similar to that described in Example 7, to thereby produce an exhaust gas purifying catalyst product of the present invention including an exhaust gas purifying catalyst layer supported on a carrier.

Example 22

The procedure of Example 15 was repeated, except that $La_{7.33}BaNdSi_6O_{25.50}$ was replaced with $Pr_{7.33}Sr_2Si_6O_{25.00}$ produced in a manner similar to that described in Example 8, to thereby produce an exhaust gas purifying catalyst product of the present invention including an exhaust gas purifying catalyst layer supported on a carrier.

Example 23

The procedure of Example 15 was repeated, except that $La_{7.33}BaNdSi_6O_{25.50}$ was replaced with $Pr_{7.33}Ba_2Si_6O_{25.0}$ produced in a manner similar to that described in Example 9, to thereby produce an exhaust gas purifying catalyst product of the present invention including an exhaust gas purifying catalyst layer supported on a carrier.

Example 24

The procedure of Example 15 was repeated, except that $La_{7.33}BaNdSi_6O_{25.50}$ was replaced with $Pr_{6.33}Ba_2NdSi_6O_{25.00}$ produced in a manner similar to that described in Example 10, to thereby produce an exhaust gas purifying catalyst product of the present invention including an exhaust gas purifying catalyst layer supported on a carrier.

Example 25

The procedure of Example 15 was repeated, except that $La_{7.33}BaNdSi_6O_{25.50}$ was replaced with $Pr_{6.33}Ba_2YSi_6O_{25.00}$ produced in a manner similar to that described in Example 11, to thereby produce an exhaust gas purifying catalyst product of the present invention including an exhaust gas purifying catalyst layer supported on a carrier.

Comparative Example 5

Activated alumina (45 parts), $CeZrO_2$ (45 parts), alumina sol (10 parts), and water (130 parts) were mixed by means of a ball mill, to thereby prepare slurry C.

A cordierite honeycomb base structure was immersed in slurry C and taken out therefrom, and then excess slurry was removed from the base structure through blowing. Subsequently, the resultant honeycomb base structure was dried at 90° C. for 10 minutes and fired at 600° C. for three hours, to thereby form a coating layer. The amount of the coating layer was found to be 100 g on the basis of 1 L of the honeycomb base structure. The resultant honeycomb base structure having the coating layer was immersed in a certain concentration of aqueous dinitrodiammine Pt solution and taken out therefrom, and then excess droplets were removed from the base structure through blowing. Thereafter, the honeycomb base structure was dried at 90° C. for 10 minutes and fired at 600° C. for three hours, to thereby support Pt on the coating layer so that the amount of Pt was 0.60 g on the basis of 100 g of the coating layer (corresponding to 1 L of the honeycomb base structure). Thus, a first noble-metal-supported layer was formed.

Subsequently, the honeycomb base structure on which the first noble-metal-supported layer had been formed was immersed in slurry B which had been prepared by mixing activated alumina (30 parts), $CeZrO_2$ (60 parts), alumina sol (10 parts), and water (150 parts) by means of a ball mill. Then, the honeycomb base structure was taken out from the slurry, and excess slurry was removed from the base structure through blowing. Thereafter, the resultant honeycomb base structure was dried at 90° C. for 10 minutes and fired at 600° C. for three hours, to thereby form a coating layer. The amount of the coating layer was found to be 100 g on the basis of 1 L of the honeycomb base structure. The resultant honeycomb base structure was immersed in a certain concentration of aqueous rhodium nitrate solution and taken out therefrom, and then excess droplets were removed from the base structure through blowing. Thereafter, the honeycomb base structure was dried at 90° C. for 10 minutes and fired at 600° C. for three hours, to thereby support Rh on the coating layer so that the amount of Rh was 0.20 g on the basis of 100 g of the coating layer (corresponding to 1 L of the honeycomb base structure). Thus, a second noble-metal-supported layer was formed, to thereby produce an exhaust gas purifying catalyst product including an exhaust gas purifying catalyst layer supported on a carrier.

Comparative Example 6

The procedure of Example 15 was repeated, except that $La_{7.33}BaNdSi_6O_{25.50}$ was replaced with $La_{8.33}BaSi_{4.5}Fe_{1.5}O_{24.75}$, to thereby produce an exhaust gas purifying catalyst product including an exhaust gas purifying catalyst layer supported on a carrier.

<Exhaust Gas Purification Performance Test>

Each of the exhaust gas purifying catalyst products of Examples 15 to 25 and Comparative Examples 5 and 6 was subjected to durability-imparting treatment in air containing 10 vol. % water vapor by means of an electric furnace at 900° C. for 25 hours, and then the catalyst product was cored (15 cc). Subsequently, each of the exhaust gas purifying catalyst products was separately charged into an evaluation apparatus. While a model exhaust gas having the composition shown in Table 7 was caused to flow through the evaluation apparatus at a space velocity of 100,000/h, the temperature in the apparatus was elevated to 500° C. at a rate of 20 degrees (° C.)/minute, and the percent removal of CO, HC, or $NO_x$ was continuously determined. Table 8 shows the temperature at which the model gas is purified by 50% (T50) (° C.) and the percent purification of the model gas at 400° C. (η400) (%).

TABLE 7

| | | | Model exhaust gas | | | | | |
|---|---|---|---|---|---|---|---|---|
| A/F | CO | $H_2$ | $O_2$ | NO | $C_3H_6$ | $CO_2$ | $H_2O$ | $N_2$ |
| 14.6 | 0.50% | 0.17% | 0.50% | 500 ppm | 1200 ppm | 14% | 10% | Bal. |

TABLE 8

Results of evaluation test using model exhaust gas

| | T50 (° C.) | | | η400 (%) | | |
|---|---|---|---|---|---|---|
| | CO | HC | $NO_x$ | CO | HC | $NO_x$ |
| Catalyst product of Ex. 15 | 258 | 290 | 314 | 91.6 | 99.5 | 98.7 |
| Catalyst product of Ex. 16 | 260 | 291 | 318 | 91.4 | 99.3 | 98.6 |
| Catalyst product of Ex. 17 | 254 | 289 | 317 | 91.8 | 99.0 | 98.5 |
| Catalyst product of Ex. 18 | 262 | 293 | 332 | 90.0 | 99.4 | 98.7 |
| Catalyst product of Ex. 19 | 259 | 296 | 325 | 89.7 | 98.9 | 98.7 |
| Catalyst product of Ex. 20 | 262 | 299 | 327 | 88.5 | 99.1 | 98.5 |
| Catalyst product of Ex. 21 | 267 | 292 | 322 | 90.7 | 98.7 | 98.4 |
| Catalyst product of Ex. 22 | 260 | 289 | 320 | 91.0 | 99.0 | 98.3 |
| Catalyst product of Ex. 23 | 255 | 280 | 310 | 91.6 | 99.3 | 98.6 |
| Catalyst product of Ex. 24 | 257 | 285 | 317 | 91.8 | 99.2 | 98.7 |
| Catalyst product of Ex. 25 | 256 | 282 | 314 | 91.2 | 99.3 | 98.4 |
| Catalyst product of Comp. Ex. 5 | 298 | 326 | 345 | 86.7 | 98.1 | 97.3 |
| Catalyst product of Comp. Ex. 6 | 268 | 303 | 332 | 88.0 | 99.2 | 98.3 |

As is clear from data shown in Table 8, the exhaust gas purifying catalyst products of Examples 15 to 25 (i.e., the exhaust gas purifying catalyst products of the present invention) are superior to those of Comparative Examples 5 and 6 in terms of both T50 (temperature at which exhaust gas is purified by 50%; i.e., an exhaust gas purifying catalyst product exhibiting low T50 has excellent low-temperature activity) of CO, HC, or $NO_x$ and η400 (percent purification of exhaust gas at 400° C.). Thus, the exhaust gas purifying catalyst products of the present invention exhibit high low-temperature activity and excellent heat resistance, and attain consistent exhaust gas purification performance. Comparison between the catalyst products of Examples 15 to 17 and those of Examples 18 to 20 show that when the site A of the composite oxide is ternary, the effect of substitution of the site B by Fe is small.

Functional Evaluation of Apatite

Example 26

Pt (1 mass %)/$La_{7.33}BaNdSi_6O_{25.50}$ produced in a manner similar to that described in Example 1 (100 parts), alumina sol (10 parts as reduced to $Al_2O_3$ solid content), and water (110 parts) were mixed by means of a ball mill, to thereby prepare a slurry. A honeycomb base structure was immersed in the slurry and taken out therefrom, and then excess slurry was removed from the base structure through blowing. Subsequently, the resultant honeycomb base structure was dried at 90° C. for 10 minutes and fired at 600° C. for three hours, to thereby form a coating layer. Thus, an exhaust gas purifying catalyst product was produced. The amount of the coating layer was found to be 110 g on the basis of 1 L of the honeycomb base structure.

Example 27

The procedure of Example 26 was repeated, except that $La_{7.33}BaNdSi_6O_{25.50}$ was replaced with $La_{7.33}BaNdSi_{4.5}Fe_{1.5}O_{24.75}$ produced in a manner similar to that described in Example 2, to thereby produce an exhaust gas purifying catalyst product.

Comparative Example 7

The procedure of Example 26 was repeated, except that $La_{7.33}BaNdSi_6O_{25.50}$ was replaced with $Al_2O_3$, to thereby produce an exhaust gas purifying catalyst product.

Comparative Example 8

The procedure of Example 26 was repeated, except that $La_{7.33}BaNdSi_6O_{25.50}$ was replaced with $La_{8.33}BaSi_{4.5}Fe_{1.5}O_{24.75}$ produced in a manner similar to that described in Comparative Example 2, to thereby produce an exhaust gas purifying catalyst product.

<Exhaust Gas Purification Performance Test>

Each of the exhaust gas purifying catalyst products of Examples 26 and 27 and Comparative Examples 7 and 8 was subjected to durability-imparting treatment in air containing 10 vol. % water vapor by means of an electric furnace at 900° C. for 25 hours, and then the catalyst product was cored (15 cc). Subsequently, each of the exhaust gas purifying catalyst products was separately charged into an evaluation apparatus. While a model exhaust gas having the composition shown in Table 9 was caused to flow through the evaluation apparatus at a space velocity of 100,000/h, the temperature in the apparatus was elevated to 500° C. at a rate of 20 degrees (° C.)/minute, and the percent removal of HC was continuously determined. Table 10 shows the temperature at which the model gas is purified by 50% (T50) (° C.) and the percent purification of the model gas at 400° C. ($\eta 400$) (%).

TABLE 9

Composition of Model gas

| $C_3H_6$ | $O_2$ | $N_2$ |
|---|---|---|
| 1200 ppm | 0.18% | Balance |

TABLE 10

Results of evaluation test using model exhaust gas

| | T50 (° C.) | $\eta 400$ (%) |
|---|---|---|
| Catalyst product of Ex. 26 | 313 | 88.8 |
| Catalyst product of Ex. 27 | 317 | 87.0 |
| Catalyst product of Comp. Ex. 7 | — | 32.7 |
| Catalyst product of Comp. Ex. 8 | 325 | 83.7 |

As is clear from data shown in Table 10, the exhaust gas purifying catalyst product of the present invention employing apatite exhibits strong ability to oxidize HC, and particularly, the exhaust gas purifying catalyst product of Example 26 exhibits high low-temperature activity and excellent heat resistance, and attains consistent exhaust gas purification performance.

<Degree of Noble Metal Dispersion>

For each of the exhaust gas purifying catalysts of Examples 1 and 2 and Comparative Examples 1 and 2, the degree of noble metal dispersion was measured according to the CO pulse adsorption method (i.e., known technique) (T. Takeguchi, S. Manabe, R. Kikuchi, K. Eguchi, T. Kanazawa, S. Matsumoto, Applied Catalysis A: 293 (2005) 91.). The degree of noble metal dispersion is calculated by use of the following formula:

degree of noble metal dispersion=the amount (by mole) of platinum corresponding to the amount of CO adsorbed/the total amount (by mole) of platinum contained in the catalyst of interest.

The results of measurement are shown in Table 11.

TABLE 11

| Degree of noble metal dispersion | | | |
|---|---|---|---|
| Catalyst of Example 1 | Catalyst of Example 2 | Catalyst of Comparative Example 1 | Catalyst of Comparative Example 2 |
| 0.035 | 0.035 | 0.468 | 0.035 |

The degree of noble metal dispersion indirectly represents the degree of probability of contact between the noble metal and exhaust gas. The higher the degree of noble metal dispersion, the higher the contact efficiency between the noble metal and exhaust gas. As is clear from data shown in Table 11, the degree of Pt dispersion in each of the catalysts of Examples 1 and 2 and Comparative Example 2 is lower than that in the catalyst of Comparative Example 1.

<Observation of the State of Adsorbed $C_3H_6$>

Each of the exhaust gas purifying catalysts of Example 1 and Comparative Examples 1 and 2 was subjected to IR spectrometry by means of FT-720 (product of Horiba, Ltd.). Firstly, while He was caused to flow through a sample chamber of the apparatus charged with a sample at a flow rate of 175 mL/min, the temperature in the chamber was elevated to 400° C. Subsequently, He was replaced with $H_2$, and the sample chamber was maintained at this temperature for 10 minutes. Thereafter, $H_2$ was replaced with He, and the temperature was lowered to 50° C., to thereby remove substances adsorbed on the sample (i.e., pretreatment of the sample). Subsequently, the sample was heated to 300° C. or 400° C. in an He atmosphere for background measurement. Then, He was replaced with a gas mixture of 1% $C_3H_6$ and 99% He, and 1 minute, 5 minutes, 10 minutes, and 15 minutes thereafter, the state of $C_3H_6$ adsorbed on the surface of the sample was observed.

Figure 2:
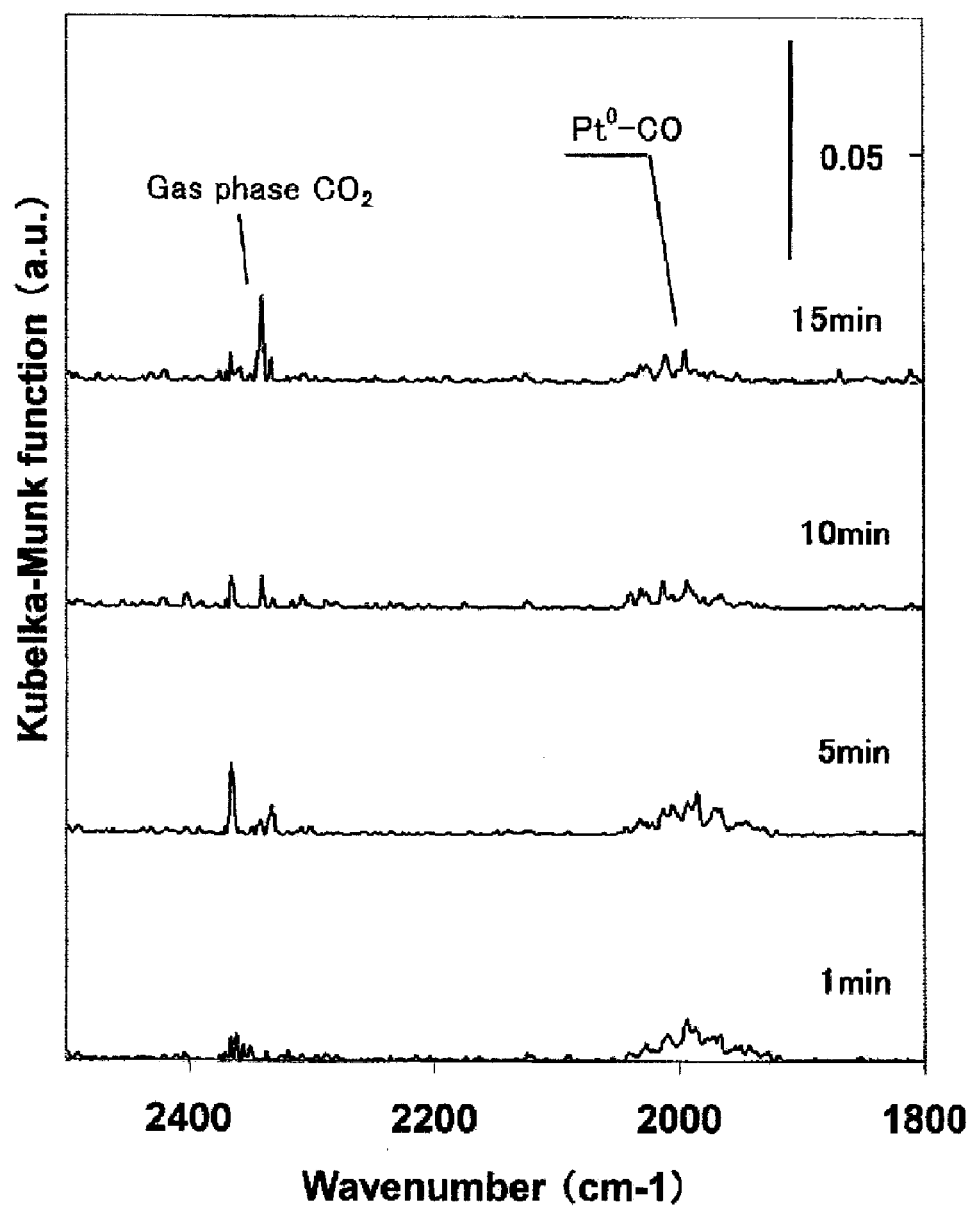
FIG. 2 shows the state of $C_3H_6$ adsorbed on the exhaust gas purifying catalyst of Comparative Example 1 in the case of heating to 300° C.

FIG. 1 shows the state of $C_3H_6$ adsorbed on the exhaust gas purifying catalyst of Example 1 in the case of heating to 300° C.; FIG. 2 shows the state of $C_3H_6$ adsorbed on the exhaust gas purifying catalyst of Comparative Example 1 in the case of heating to 300° C.; and FIG. 3 shows the state of $C_3H_6$ adsorbed on the exhaust gas purifying catalyst of Comparative Example 2 in the case of heating to 300° C.

Figure 4:
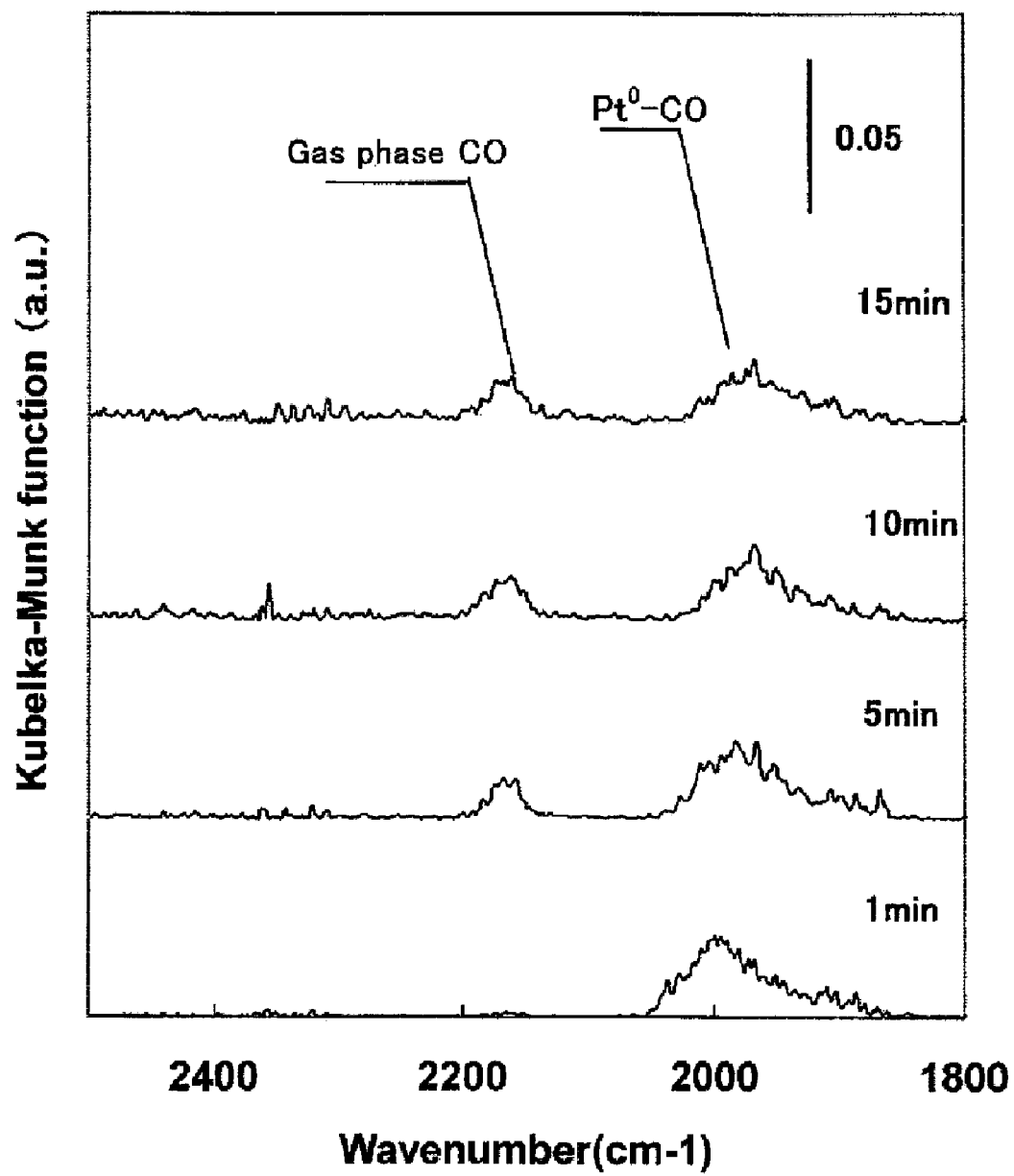
FIG. 4 shows the state of $C_3H_6$ adsorbed on the exhaust gas purifying catalyst of Example 1 in the case of heating to 400° C.
Figure 5:
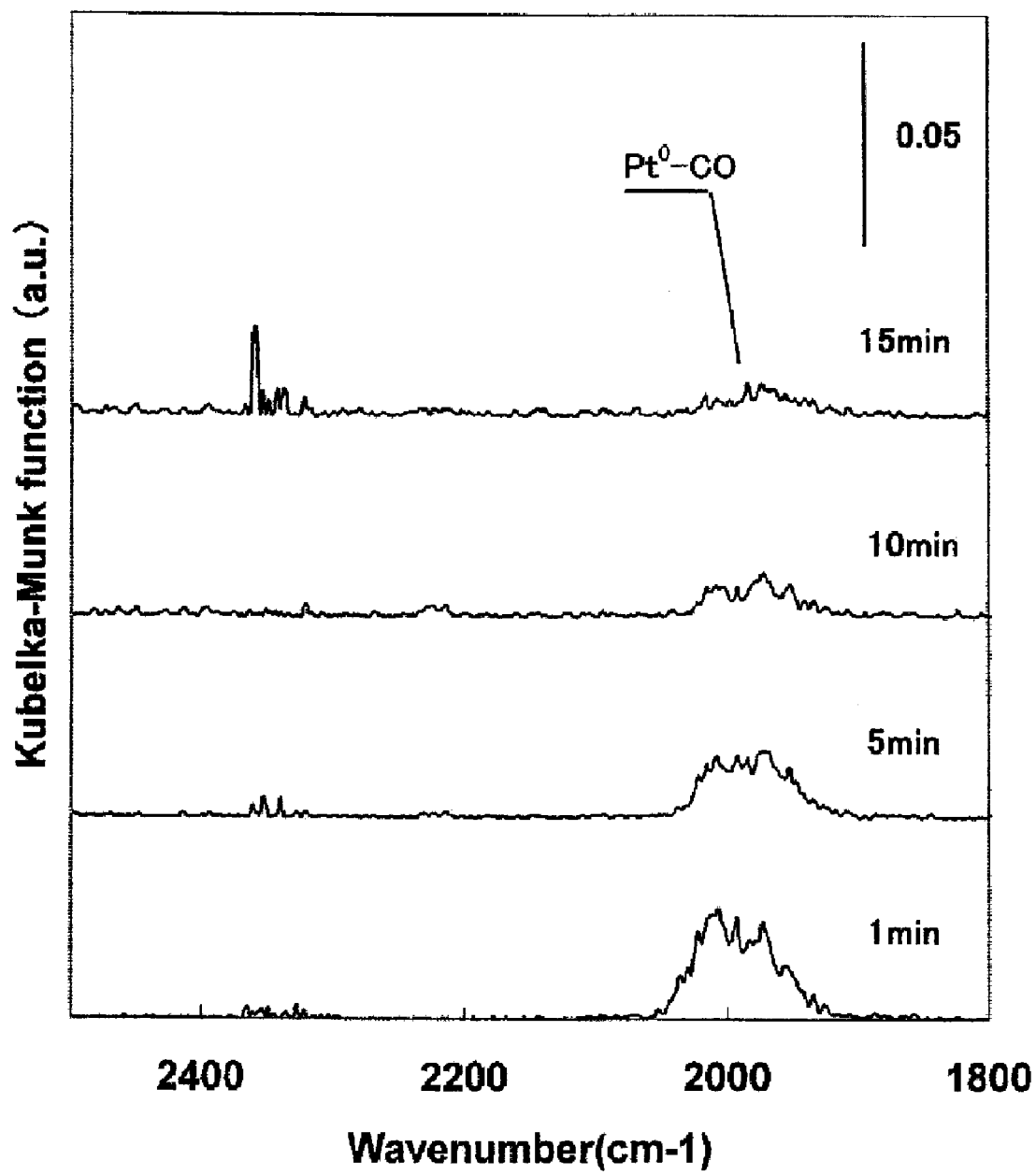
FIG. 5 shows the state of $C_3H_6$ adsorbed on the exhaust gas purifying catalyst of Comparative Example 1 in the case of heating to 400° C.

FIG. 4 shows the state of $C_3H_6$ adsorbed on the exhaust gas purifying catalyst of Example 1 in the case of heating to 400° C.; FIG. 5 shows the state of $C_3H_6$ adsorbed on the exhaust gas purifying catalyst of Comparative Example 1 in the case of heating to 400° C.; and FIG. 6 shows the state of $C_3H_6$ adsorbed on the exhaust gas purifying catalyst of Comparative Example 2 in the case of heating to 400° C.

Figure 3:
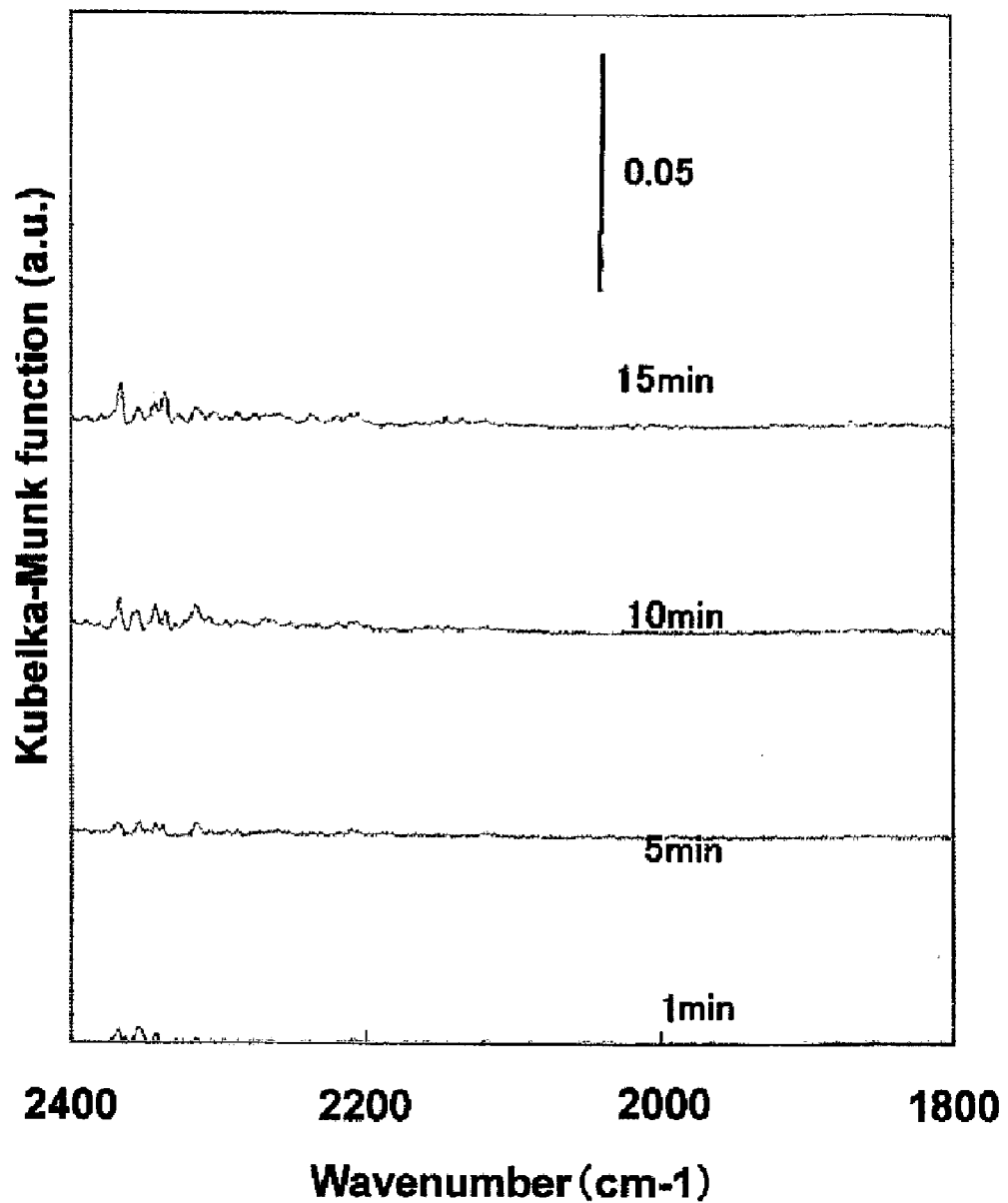
FIG. 3 shows the state of $C_3H_6$ adsorbed on the exhaust gas purifying catalyst of Comparative Example 2 in the case of heating to 300° C.

As is clear from FIGS. 1 to 3, in the case of heating to 300° C., each of the exhaust gas purifying catalysts of Example 1 and Comparative Example 1 exhibits a spectral peak attributed to CO ($Pt^0$—CO) adsorbed on Pt in the vicinity of 2,000 $cm^{-1}$, but the exhaust gas purifying catalyst of Comparative Example 2 does not exhibit a spectral peak in the vicinity of 2,000 $cm^{-1}$. The exhaust gas purifying catalyst of Example 1 exhibits a spectral peak attributed to gas-phase CO which is considered to be released from the sample, and the exhaust gas purifying catalyst of Comparative Example 1 exhibits a spectral peak attributed to gas-phase $CO_2$. In the case of the exhaust gas purifying catalyst of Example 1, the intensity of spectral peaks attributed to $Pt^0$—CO and gas-phase CO increases over time. In contrast, in the case of the exhaust gas purifying catalyst of Comparative Example 1, there is a tendency that the intensity of a spectral peak attributed to $Pt^0$—CO decreases over time, but the intensity of a spectral peak attributed to gas-phase $CO_2$ increases over time.

Figure 6:
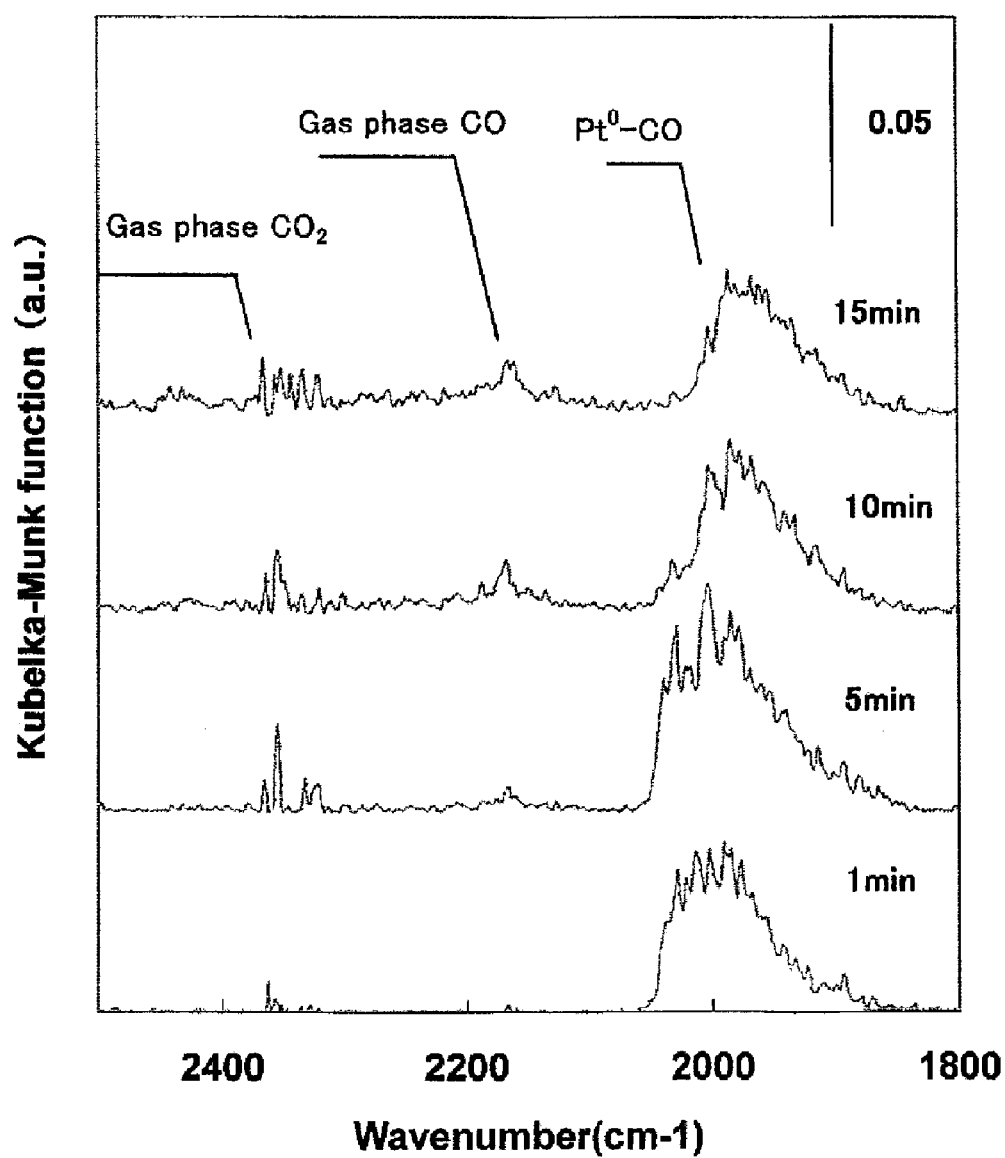
FIG. 6 shows the state of $C_3H_6$ adsorbed on the exhaust gas purifying catalyst of Comparative Example 2 in the case of heating to 400° C.

As is clear from FIGS. 4 to 6, in the case of heating to 400° C., each of the exhaust gas purifying catalysts of Example 1 and Comparative Example 1 exhibits spectral peaks similar to those observed in the case of heating to 300° C., and shows a tendency of change over time in spectral peak intensity similar to that in the case of heating to 300° C. The exhaust gas purifying catalyst of Comparative Example 2 exhibits spectral peaks similar to those observed in the exhaust gas purifying catalyst of Example 1, and the intensity of the spectral peaks observed in the catalyst of Comparative Example 2 tends to increase over time.

Oxidation of $C_3H_6$ to CO on Pt requires supply of oxygen to Pt. Since oxygen is not present under the aforementioned measurement conditions, observation of a spectral peak attributed to $Pt^0$—CO demonstrates that oxygen is supplied from the carrier to Pt.

Discussion based on the aforementioned data shows that, in each of the exhaust gas purifying catalysts of Example 1 and Comparative Example 2, lattice oxygen of apatite is continued to be supplied to Pt, and the thus-generated CO is released as is (i.e., partial oxidation reaction), whereas in the exhaust gas purifying catalyst of Comparative Example 1, substantially no oxygen is supplied to Pt, and a small amount of CO adsorbed on Pt is oxidized to $CO_2$ (i.e., complete oxidation reaction).

As described above, in the exhaust gas purifying catalyst of the present invention, despite its low degree of noble metal dispersion, interaction occurs between a noble metal and a composite oxide forming the catalyst; i.e., strong metal-support interaction (SMSI) occurs. Occurrence of the interaction promotes partial oxidation reaction of a hydrocarbon, and also promotes reduction reaction of the thus-generated carbon monoxide and nitrogen oxides. Therefore, the exhaust gas purifying catalyst of the present invention exhibits, over a low to high temperature range, high effect of purifying exhaust gas discharged from an internal combustion engine.

The invention claimed is:

1. An exhaust gas purifying catalyst, characterized by comprising:
   a composite oxide represented by the following formula:

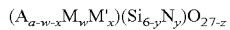

wherein A is a cation of at least one element selected from the group consisting of La and Pr; M is a cation of at least one element selected from the group consisting of Ba, Ca, and Sr; M' is a cation of at least one element selected from the group consisting of Nd, Y, Al, Pr, Ce, Sr, Li, and Ca; N is a cation of at least one element selected from the group consisting of Fe, Cu, and Al; and the following relations are satisfied: $6 \leq a \leq 10$, $0<w<5$, $0 \leq x<5$, $0<w+x \leq 5$, $0 \leq y \leq 3$, $0 \leq z \leq 3$, $A \neq M'$, and $x \neq 0$ when A is a cation of La; and
   a noble metal ingredient which forms a solid solution with the composite oxide or is supported on the composite oxide.

2. An exhaust gas purifying catalyst according to claim 1, which comprises:
   a composite oxide represented by the following formula:

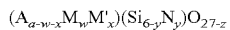

wherein A is a cation of La; M is a cation of at least one element selected from the group consisting of Ba, Ca, and Sr; M' is a cation of at least one element selected from the group consisting of Nd, Y, Al, Pr, Ce, Sr, Li, and Ca; N is a cation of at least one element selected from the group consisting of Fe, Cu, and Al; and the following relations are satisfied: $6 \leq a \leq 10$, $0<w<5$, $0<x<5$, $0<w+x \leq 5$, $0<y \leq 3$, and $0 \leq z \leq 3$, and
   a noble metal ingredient which forms a solid solution with the composite oxide or is supported on the composite oxide.

3. An exhaust gas purifying catalyst according to claim 1, which comprises:
   a composite oxide represented by the following formula:

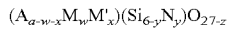

wherein A is a cation of Pr; M is a cation of at least one element selected from the group consisting of Ba, Ca, and Sr; M' is a cation of at least one element selected from the group consisting of Nd, Y, Al, Ce, Sr, Li, and Ca; N is a cation of at least one element selected from the group consisting of Fe, Cu, and Al; and the following relations are satisfied: $6 \leq a \leq 10$, $0<w<5$, $0 \leq x<5$, $0<w+x \leq 5$, $0 \leq y \leq 3$, and $0 \leq z \leq 3$, and
   a noble metal ingredient which forms a solid solution with the composite oxide or is supported on the composite oxide.

4. An exhaust gas purifying catalyst product, characterized by comprising a carrier made of a ceramic or metallic material, and a layer of an exhaust gas purifying catalyst as recited in claim 1 supported on the carrier.

5. An exhaust gas purifying catalyst product, characterized by comprising a carrier made of a ceramic or metallic material, and a layer of an exhaust gas purifying catalyst as recited in claim 2 supported on the carrier.

6. An exhaust gas purifying catalyst product, characterized by comprising a carrier made of a ceramic or metallic material, and a layer of an exhaust gas purifying catalyst as recited in claim 3 supported on the carrier.

* * * * *